United States Patent
Farrow et al.

(10) Patent No.: US 12,277,865 B2
(45) Date of Patent: Apr. 15, 2025

(54) METHODS AND APPARATUSES FOR TRAINING INSTALLERS OF SURFACE-PROTECTION FILM

(71) Applicant: EASTMAN PERFORMANCE FILMS, LLC, Saint Louis, MO (US)

(72) Inventors: James Yancy Farrow, Lake St. Louis, MO (US); Bobby Howard Cardwell, Lake View, SC (US); Amanda Smart Brown, Saint Louis, MO (US); Richard Anthony Dill, Penhook, VA (US); Michael Stephen Powell, Gainesville, FL (US); Jacob Neal Motley, Danville, VA (US); Nikolaie Arnold Brown, Spring, TX (US); Keister Logan Richardson, III, Danville, VA (US); Igor Leonidovich Zheldakov, Reidsville, NC (US)

(73) Assignee: Eastman Performance Films, LLC, St. Louis, MO (US)

( * ) Notice: Subject to any disclaimer, the term of this patent is extended or adjusted under 35 U.S.C. 154(b) by 903 days.

(21) Appl. No.: 17/432,984

(22) PCT Filed: Feb. 12, 2020

(86) PCT No.: PCT/US2020/017849
§ 371 (c)(1),
(2) Date: Aug. 23, 2021

(87) PCT Pub. No.: WO2020/176259
PCT Pub. Date: Sep. 3, 2020

(65) Prior Publication Data
US 2022/0165180 A1   May 26, 2022

Related U.S. Application Data

(60) Provisional application No. 62/810,603, filed on Feb. 26, 2019.

(51) Int. Cl.
G09B 19/24 (2006.01)
B26D 3/08 (2006.01)
B26D 7/00 (2006.01)

(52) U.S. Cl.
CPC ............. G09B 19/24 (2013.01); B26D 3/085 (2013.01); *B26D 2007/0012* (2013.01); *B26D 2210/00* (2013.01)

(58) Field of Classification Search
CPC . G09B 19/24; B26D 3/085; B26D 2007/0012
See application file for complete search history.

(56) References Cited

U.S. PATENT DOCUMENTS

| 2,118,664 A | 1/1937 | Bradshaw et al. |
| 2,331,721 A | 8/1939 | Ostrofsky et al. |

(Continued)

FOREIGN PATENT DOCUMENTS

| AU | 2007 202368 A1 | 6/2007 |
| CN | 1493635 A | 5/2004 |

(Continued)

OTHER PUBLICATIONS

Co-pending U.S. Appl. No. 17/290,826, filed Oct. 22, 2019, Carver et al.

(Continued)

*Primary Examiner* — Omar Flores Sanchez
(74) *Attorney, Agent, or Firm* — Judith C. Rawls

(57) ABSTRACT

Methods are disclosed for training an installer to cut a film without damaging an underlying substrate. The methods include the steps of applying a stretchable surface-protection film to an electrically-conductive substrate provided with at least one irregularity; and cutting the surface protection film with an electrically-conductive knife which, when in contact with the electrically-conductive substrate, causes one or (Continued)

more notifications to occur. Also disclosed are devices that may be used in carrying out the methods of the invention.

17 Claims, 3 Drawing Sheets

(56) References Cited

U.S. PATENT DOCUMENTS

| | | | |
|---|---|---|---|
| 3,909,424 | A | 9/1975 | Clark |
| 4,199,649 | A | 4/1980 | Yundt |
| 5,294,278 | A * | 3/1994 | Matsui .................... B26D 7/34 156/247 |
| 5,518,786 | A | 5/1996 | Johnson et al. |
| 5,795,427 | A * | 8/1998 | Arakawa .............. B26F 1/3846 156/212 |
| 5,939,378 | A | 8/1999 | Stringer et al. |
| 6,360,801 | B1 | 3/2002 | Walter et al. |
| 6,699,825 | B2 | 3/2004 | Rees et al. |
| 6,927,237 | B2 | 8/2005 | Hei et al. |
| 6,998,369 | B2 | 2/2006 | Hei et al. |
| 7,992,482 | B2 * | 8/2011 | Kim ........................ C03B 33/03 225/2 |
| 8,241,428 | B2 | 8/2012 | Cermenati et al. |
| 8,246,906 | B2 | 8/2012 | Hei et al. |
| 8,940,122 | B2 | 1/2015 | Cohen et al. |
| 9,138,979 | B2 * | 9/2015 | Balakoff .............. B32B 27/325 |
| 10,414,956 | B2 * | 9/2019 | Masuko .................... C09J 7/22 |
| 10,994,876 | B2 * | 5/2021 | Gunner ................... B65B 57/06 |
| 11,840,649 | B2 | 12/2023 | Carver et al. |
| 2003/0068606 | A1 * | 4/2003 | Nicholls ................ G09B 23/34 434/262 |
| 2005/0215448 | A1 | 9/2005 | Evers et al. |
| 2007/0187028 | A1 | 8/2007 | Braun et al. |
| 2007/0235061 | A1 | 10/2007 | Mizuta et al. |
| 2007/0281857 | A1 | 12/2007 | Wilson et al. |
| 2008/0003406 | A1 | 1/2008 | Steelman |
| 2013/0280499 | A1 | 10/2013 | Kanno et al. |
| 2018/0286278 | A1 | 10/2018 | Alexandre et al. |
| 2020/0017710 | A1 | 1/2020 | Sumner et al. |
| 2021/0251260 | A1 | 8/2021 | Rithvik |
| 2022/0165180 | A1 | 5/2022 | Farrow et al. |
| 2023/0257632 | A1 | 8/2023 | Carter et al. |

FOREIGN PATENT DOCUMENTS

| | | |
|---|---|---|
| CN | 103538339 A | 1/2014 |
| CN | 205920675 U | 2/2017 |
| CN | 107856097 A | 3/2018 |
| CN | 108045061 A | 5/2018 |
| CN | 108248008 A | 7/2018 |
| CN | 207842238 U | 9/2018 |
| CN | 109229072 A | 1/2019 |
| CN | 107687985 A | 2/2020 |
| FR | 2629095 A1 | 9/1989 |
| JP | 3754868 B2 | 3/2006 |
| JP | 2007050622 A | 3/2007 |
| JP | 2007160697 A | 6/2007 |
| JP | 2009160738 A | 7/2009 |
| KR | 20140047281 A | 4/2014 |
| WO | WO 2004054727 A1 | 7/2004 |
| WO | WO 2020/176259 A1 | 9/2020 |

OTHER PUBLICATIONS

PCT International Search Report for International Application No. PCT/US2019/057313 with date of mailing Feb. 4, 2020.
PCT International Search Report for International Application No. PCT/US2020/017849 with date of mailing May 4, 2020.
Anonymous, Self-Healing Paint Protection Film Edges Lifting, Llumar, Jan. 1, 2015, pp. 1-3.
Norton, John, et al., "The Physical Chemistry of Disinfection, I", The Journal of Infectious Diseases, Feb. 1916, vol. 18, No. 2, pp. 180-194.
Co-pending U.S. Appl. No. 18/162,779, filed Feb. 1, 2023, Carver et al. Now U.S. Publication No. 2023-0257632.
Notice of Allowance and Fee(s) due dated Sep. 20, 2023 received in co-pending U.S. Appl. No. 17/290,826.
Office Communication notification date Jul. 17, 2024 received in co-pending U.S. Appl. No. 18/162,779.
Notice of Allowance and Fee(s) due dated Oct. 31, 2023 received in co-pending U.S. Appl. No. 17/290,826.

* cited by examiner

METHODS AND APPARATUSES FOR TRAINING INSTALLERS OF SURFACE-PROTECTION FILM

CROSS-REFERENCE TO RELATED APPLICATION(S)

This application is a national stage filing under 35 USC § 371 of International Application Number PCT/US2020/017849, filed on, Feb. 12, 2020 which claims the benefit of the filing date to U.S. Provisional Application No. 62/810,603, filed on Feb. 26, 2019, the entire disclosures of which are incorporated by reference herein.

FIELD OF THE INVENTION

The present invention is generally directed to methods and apparatuses for training installers to cut surface protection film without damaging the underlying substrate.

BACKGROUND OF THE INVENTION

Surface-protection films (SPFs) such as paint protection films (PPFs) are used in many different markets, including appliances, motorcycles, boats, wind turbine blades, and other high value surfaces. Patterns may assist installers in selecting the proper size and shape of film to be used on a given surface, fine trimming and shaping are still required. And since patterns are typically only available for cars, installers often hand-cut films intended for these other applications, which may involve custom paint jobs, exotic woods, and expensive rotating components. The costs for damaging all these surfaces can be quite significant, so proper training on cutting SPFs for these applications is critical.

Application of a surface-protection film (SPF) such as a paint-protection film involves applying a pliable, stretchable, essentially two-dimensional SPF to a complex three-dimensional substrate that may contain a variety of irregularities such as bends, curves, peaks, valleys, and voids for a variety of substrate features. When applying a two-dimensional SPF to a complex substrate, a certain amount of stretch is introduced as it is applied to the substrate to prevent having an excess of film that will not conform and adhere to the numerous substrate variations. For conformance to the substrate to occur, the installation of SPF may involve the use of tack solutions and slip solutions to allow the introduction of stretch to occur and to help hold the film down at the edges and in the valleys without lifting. A negative result of creating this stretch for proper installation is that the final thickness and/or tension of the SPF may vary depending upon the amount of stretch needed to allow it to conform to the substrate. This variation in thickness and tension prevents the installer from using a fixed cutting depth blade. The installer must instead depend upon the "feel" of the blade as it cuts to determine adequate penetration while cutting.

Higher skilled installers often bulk-apply the film, then trim the film to the edge of each car panel for a quality fit. One of the biggest challenges and risks associated with the installation of SPF on three-dimensional substrates is trimming excess film on the substrate once attached to the substrate it is intended to protect. Also, when installing SPF on automobiles it is also often required to hand cut the film around back up sensors, reflectors, or badges after installation on the automobile. During either of these circumstances the risk of damaging the paint is present.

Unskilled or untrained installers can apply too much pressure on the cutting blade or use the wrong angle of the blade and penetrate through the SPF, thus contacting and scratching the very substrate they have been asked to protect. Proper pressure and blade angle are critical to success, as unintentionally cutting the substrate results in costly repairs to remove the newly installed film and restore the substrate back to the original condition before reinstalling the SPF. There remains a need in the art to train new or experienced installers to hone their skills and develop the difficult-to-perceive tactile response of the blade as it cuts through each layer of the SPF, and especially the adhesive layer that is in contact with the substrate being protected.

SUMMARY OF THE INVENTION

In one aspect, the present invention relates to methods to train an installer to cut a film without damaging an underlying substrate, the methods including the steps of applying a stretchable surface-protection film to an electrically-conductive substrate provided with at least one irregularity; and cutting the surface protection film with an electrically-conductive knife which, when in contact with the electrically-conductive substrate, causes one or more notifications to occur. In another aspect, the invention relates to devices that may be used to carry out the inventive methods.

In one aspect, the surface protection film may comprise a) a stretchable polymer film layer; b) an adhesive layer, on a first surface of the stretchable polymer film layer, which causes the surface protection film to adhere to the electrically-conductive layer when applied; and c) a stretchable protective layer, applied on a second surface of the stretchable polymer film layer, which second surface is opposite the first surface.

In a further aspect, the surface-protection film may be applied to the electrically-conductive substrate such that the thickness of the surface-protection film varies across a surface of the substrate. Similarly, the surface-protection film may be applied to the electrically-conductive substrate such that the tension of the surface-protection film varies across a surface of the substrate. Of course, the stretching of the film will typically cause both the thickness and the tension of the surface-protection film to vary across the surface of the substrate.

In yet another aspect, the surface-protection film may be applied to the electrically-conductive substrate by a method comprising: applying a slip solution comprising one or more surfactants to the surface protection film, or the electrically-conductive substrate, or both; contacting the substrate with a tack solution at a first location on the substrate; and contacting the surface-protection film with the first location on the substrate to thereby adhere the film to the electrically-conductive substrate at the first location. Thereafter, the substrate may be contacted with a tack solution at a second location on the substrate; the surface-protection film stretched as needed to conform the surface-protection film to the at least one irregularity of the electrically-conductive substrate; and the surface-protection film contacted with the second location on the substrate to thereby adhere the film to the electrically-conductive substrate at the second location. In this aspect, likewise, the stretching of the surface-protection film may cause the thickness and/or the tension of the surface-protection film to vary across a surface of the substrate.

In yet another aspect, the surface-protection film may be applied to the electrically-conductive substrate by a method comprising contacting the surface-protection film at a first location on the substrate to thereby adhere the film to the electrically-conductive substrate at the first location; stretching the surface-protection film as needed to conform the surface-protection film to the at least one irregularity of the electrically-conductive substrate; and contacting the surface-protection film at a second location on the substrate to thereby adhere the film to the electrically-conductive substrate at the second location. In this aspect, likewise, the stretching of the surface-protection film may cause the thickness and/or the tension of the surface-protection film to vary across a surface of the substrate.

In one aspect, the stretchable polymer film layer of the surface-protection film may comprise one or more of: polyurethane, polyester, or vinyl. The thickness of the stretchable polymer film layer may vary, for example having a thickness from about 25 microns to about 375 microns, or as described elsewhere herein.

In a further aspect, the stretchable protective layers of the surface-protection film of the invention may comprise one or more of a polyurethane, a polyester, a polycaprolactone, a polyvinyl, a polyetyer, or an acrylate or methacrylate.

In one aspect of the methods of the present invention, the substrates of the invention will have at least one irregularity, for example a bend, a curve, and/or a void. In another aspect, the one or more notifications that occur when the electrically-conductive knife contacts the electrically-conductive substrate, may comprise one or more of a light, a sound, or a vibration.

In yet another aspect, the electrically-conductive knife is provided with a cutting blade, the depth of which is not fixed, allowing the installer to vary the depth, pressure, and/or angle of the cut as needed, depending on any differences in the thickness and/or tension of the surface-protection film. Thus, in another aspect, the depth of the cutting of the surface-protection film with the electrically-conductive knife according to the methods of the invention varies across a surface of the surface-protection film. In a further aspect, the angle of the cutting of the surface-protection film with the electrically-conductive knife according to the methods of the invention varies across a surface of the surface-protection film. In yet another aspect, the pressure of the cutting of the surface-protection film with the electrically-conductive knife according to the methods of the invention varies across a surface of the surface-protection film.

In a further aspect, the invention relates to devices useful for carrying out the methods of the invention, the devices being open circuits comprising: an electrically-conductive substrate mounted at a vertical and/or a horizontal angle provided with at least one irregularity; a power supply, in electrical communication with the electrically-conductive substrate; one or more notification devices selected from a visual alert, an audible alert, or a tactile alert, in electrical communication with the power supply and the electrically-conductive substrate; and an electrically-conductive knife, in electrical communication with the one or more notification devices, the power supply, and the electrically-conductive substrate such that, when the knife is brought into contact with the electrically-conductive substrate, the open circuit is closed, causing the one or more notification devices to activate.

Further aspects of the invention are as disclosed and claimed herein.

DETAILED DESCRIPTION

Figure 1:
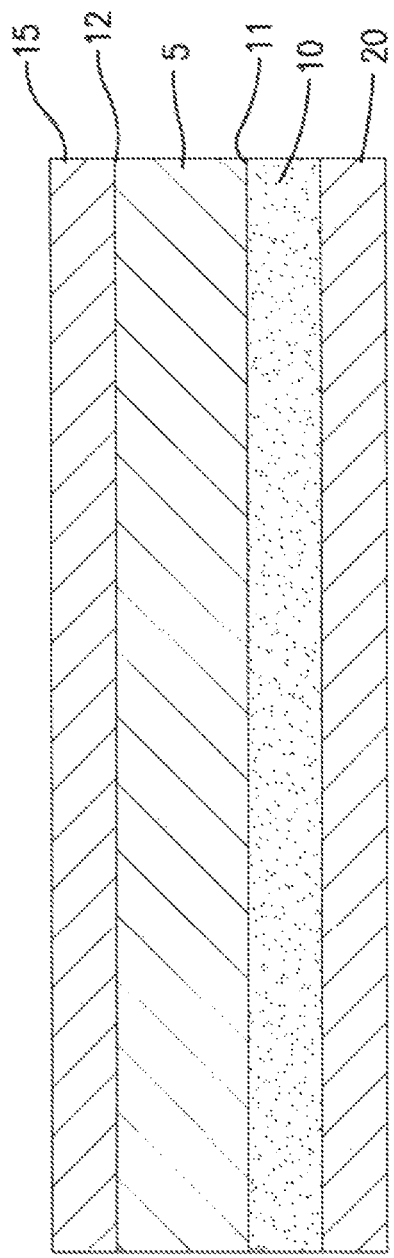
FIG. 1 depicts a stretchable surface-protection film suitable for use according to the invention.

In a first aspect, the present invention is directed to methods for training installers to cut a film without damaging an underlying substrate. In another aspect, the invention is directed to training devices that may be used in carrying out the claimed methods.

Thus, in one aspect, a method is provided to train an installer to cut a film without damaging an underlying substrate, in which a flexible, stretchable surface-protection film is applied by any suitable method to an electrically-conductive substrate that is provided with at least one irregularity. The electrically-conductive substrate may be stiff or may be flexible.

According to the invention, the electrically-conductive substrate may be made from any suitable material. For example, the substrate may be totally constructed of a conductive metal, or alternatively of a non-conductive material provided with a conductive-surface such as a metal. Metals useful according to the invention to provide an electrically-conductive substrate include iron, carbon steel, stainless steel, copper, metal-plated substrates, and the like. Other electrically-conductive materials that may be used as a substrate or as the surface of the substrate include electrically-conductive coatings and plastics. While it will be understood that the surface of the electrically-conductive substrate should remain substantially conductive, it may be advantageous to provide a coating to the surface of the substrate, to help protect the surface, so long as the substrate remains substantially conductive. Alternatively, the surface may remain uncoated, for example uncoated stainless steel. The electrically-conductive substrate will typically be electrically isolated from other objects, for example by being mounted on an insulative material, as further described below.

With respect to the electrical conductivity of the substrate, it will be understood that the substrate should be sufficiently conductive that, when the electrically-conductive knife used to cut the surface protection film inadvertently comes in contact with the electrically-conductive substrate, the current carried by the electrically-conductive substrate is sufficient to cause the one or more notifications to occur. This triggering of the one or more notifications may be a direct triggering, in which for example the light notification is caused by a light placed within the circuit of the current caused by the contacting of the knife with the substrate, such that the light activates when the circuit is closed, or alternatively the contact of the knife with the substrate may create a current that, in turn, triggers another circuit in which the light or other notification is caused to activate.

According to the invention, the substrate, which is an electrically-conductive substrate, is provided with at least one irregularity. It will be understood that these irregularities are intended to mimic as closely as possible the irregularities the installer will encounter in the field. Thus, the irregularities provided may be intended to mimic those encountered on the surfaces of automobiles, including cars, trucks, other passenger vehicles, and motorcycles, as well as a variety of commercial vehicles. Similarly, the irregularities may be intended to mimic those encountered in or on appliances, boats, wind turbine blades, and a variety of other generally smooth or flat but irregular high value surfaces which may be advantageously protected with a stretchable surface-protection film.

These irregularities may be described by a variety of generic terms, for example curves, bends, edges, ridges, valleys, projections, depressions, protuberances, voids, or holes, some of which terms of course overlap with one another. Thus, the hood of an automobile may be said to have edges on all four sides of the hood, assuming a generally square or rectangular hood, while a raised area on the hood may also be said to have an edge, if an elevation or depression exhibits at least one relatively sharp angle. Similarly, the raised portion of a hood may be considered to have a positive and/or a negative curve, a bend, a ridge, and/or a protuberance, any of which may need to be accounted for when cutting and applying the surface-protection film. Similarly, whether an irregularity is considered a void, a hole, or merely a depression or a valley may depend on the eye of the describer, or on whether the film is intended to cover a recessed area, or rather is intended to be cut out around the hole, void, or depression.

It is therefore not necessary for purposes of understanding the invention to make fine distinctions between the generic terms used to describe these irregularities of the substrate. Rather, it is sufficient to understand that while substrates that may be advantageously protected with a surface-protection film according to the invention are typically flat or smooth in two-dimensions, which may be arbitrarily assigned an x- and a y-axis, there will be voids, holes and other changes in the z-axis that will need to be accounted-for when applying and cutting the surface-protection film to properly fit the intended substrate.

Thus, while it may be possible to apply a surface-protection film to an entirely smooth, flat, mirror by a simple application process which avoids substantially stretching and cutting the surface-protection film while avoiding harming the substrate, as soon as the installer encounters one or more irregularities, various stretching and cutting operations will be required. The invention is intended to train an installer to properly apply and cut the SPF to account for these irregularities of the substrate, while avoiding damage to the underlying substrate.

In the methods according to the invention, the surface protection film is cut with an electrically-conductive knife which, when in contact with the electrically-conductive substrate, causes one or more notifications to occur. While a variety of methods of causing these notifications to occur may be used, perhaps the simplest way to cause a notification to occur is to cause the knife, the substrate, and a notification such as a light to be placed in the same electrically-conductive circuit such that, when the knife contacts the substrate, the light activates. It will be understood that a power source such as a battery should also be in this circuit in order to cause the desired electricity flow, as further elaborated on below.

There is no particular limitation with respect to the light that may be used as a notification. In fact, any light that may be observed by the installer approximately contemporaneously with the knife contacting the substrate may be used according to the invention. To emphasize that the light notification indicates an adverse event, it may be desired, for example, that the light be red or some other easily discernible color. To further encourage the installer to use proper technique while being trained, it may be helpful that the light is placed such that others observing the training can also see the light, and understand that an adverse event has occurred, that is, that the installer has inadvertently contacted the knife with the substrate, quite possibly damaging it.

In addition to a light notification, a variety of other notifications may be used according to the invention, instead of or in addition to a light. For example, the notifications may include a sound or noise, preferably an obnoxious tone that the installer would prefer to avoid hearing, or have others overhear. In this regard, while the notifications may include a vibration of the knife, of the substrate, or of both the knife and the substrate, it may be difficult for those observing the training to detect such a vibration, unless it is accompanied by a light, a sound, or an involuntary outburst of surprise by the installer who has inadvertently triggered the vibration notification. It may therefore be desirable that the vibrations be strong enough to startle the errant installer, in order to elicit the desired response and encourage them to improve their technique. This is especially the case when the training is being observed by one or more of the installer's colleagues or supervisors.

The nature of the surface-protection films used in the methods of the present invention, and their method of application, are what make the training methods of the present invention particularly significant. The surface-protection films 1 of the invention are thus characterized, referring now to FIG. 1 which is not to scale, by having a stretchable polymer film layer 5; an adhesive layer 10, on a first surface 11 of the stretchable polymer film layer, which causes the surface protection film to adhere to the electrically-conductive layer when applied; and optionally a stretchable protective layer 15, applied on a second surface 12 of the stretchable polymer film layer, which second surface is opposite the first surface.

As noted, the stretchable nature of the surface-protection films of the invention assists them in conforming, when properly cut and applied, to the one or more irregularities of the substrate to which they are to be adhered. In this regard, the stretchable polymer film layer 5 of the surface-protection film may be comprised of a variety of suitable materials. For example, the stretchable polymer film layer may comprise one or more of: an aliphatic or aromatic polyurethane, polyester, vinyl, a PVB such as a plasticized PVB, polyether, polycaprolactone.

A typical thickness of a surface-protection film 1 suitable for use according to the invention may vary from about 1 mil to about 30 mils (about 25 microns to about 750 microns), for example about 8 mils. Of this 1-20 mils, from about 0.2 to 3 mils or typically about 1-2 mils will comprise the adhesive layer 10 and the other approximately 2-18 mils being a combination of the stretchable protective layer 15 and the stretchable polymer film layer 5, for example a polyurethane film.

The stretchable polymer film layer 5 may thus vary in thickness from about 1 to about 15 mils (from about 25 microns to about 375 microns), or from 3 to 12 mils (75 microns to 300 microns), or from 5 to 10 mils (125 microns to 250 microns). Similarly, the stretchable protective layer, if present, may vary in thickness from about 0.1 to about 2 mils (from about 2.5 microns to about 50 microns), or from 0.2 mils to 1.5 mils (5 microns to 37 microns).

To properly cut the SPF, the blade should cut completely through the stretchable protective layer 15, if present, and through the stretchable polymer film layer 5, but ideally not completely through the adhesive layer 10, lest the knife inadvertently contact the underlying substrate. This is very challenging, especially considering the angle changes encountered when cutting over peaks and valleys, thickness and tension variations encountered due to stretch, and varying overall alignment of the substrate with the SPF. Additionally, each of the layers in the SPF has a different co-efficient of friction which can take years of trial and error to properly appreciate, and constant exposure to maintain a working memory of how each layer feels on the blade of the knife. An especially helpful understanding is the way the adhesive layer 10 causes a "drag" on the knife that differs in feel from that created by the stretchable polymer layer 5 and the optional stretchable protective layer 15. This difference in feel is even greater in those areas where the thickness and or tension of the stretchable polymer layer 5 differs due to stretch applied during application of the SPF to the electrically-conductive substrate.

As noted, part of the difficulty in developing the proper feel is that the application of the SPF to the substrate will cause the thickness and tension of the SPF to vary across the surface of the film. While differences in thickness can be readily appreciated as complicating the cutting of the SPF, the problems of tension variances are more nuanced. Significant increases in tension of the SPF when stretched and applied to the substrate may cause the SPF to be more easily cut. If this factor is not properly appreciated, the knife may be pressed too hard when cutting a higher tension area of the SPF, causing the knife to cut too quickly and/or too deeply, or at an improper angle. This loss of control of the knife can, of course, easily cause the substrate to be damaged by the knife, and in the context of the training methods of the present invention, cause one or more of the notifications already described to activate.

In one aspect, then, the electrically-conductive knife may be provided with a cutting blade, the depth of which is not fixed, allowing the installer to vary the depth of the cut as needed along the surface of the SPF and the substrate. In a related aspect, the depth of the cutting of the surface-protection film with the electrically-conductive knife varies across a surface of the surface-protection film and thus the substrate.

Thus, in the methods of the present invention, the surface-protection film is characterized by its stretchability, or ability to stretch during application to the substrate. No precise degree of elastic deformation or stretch ratio is required in the SPFs useful according to the invention, nor is it required that the SPF, when stretched, return to its precise shape once stretched, although in general that may be desirable.

For purposes of the invention, it will be understood that the SPF is sufficiently stretchable that, when applied, the tension and/or the thickness of the SPF will vary across the surface of the substrate to which it is applied. Thus, the ability of the SPF to stretch is an advantage in being able to properly apply the SPF to a substrate having one or more irregularities. At the same time, the ability to stretch causes one or more of the thickness and tension of the SPF to vary across the substrate to which it is applied. This variability of thickness and tension makes it difficult to apply and cut the SPF without damaging the underlying substrate, making the methods of the present invention an important part of the use of these surface-protection films. For example, the stretchability of the surface-protection film may vary from about 150% to 500%, or from 175% to 350%, or from 200% to 300%. That is, 200% stretchability means that the film may be stretched to twice its original length and return roughly to its original state.

Thus, referring again to FIG. 1, the surface-protection film 1 of the invention comprises an adhesive layer 10, on a first surface 11 of the stretchable polymer film layer 5, which causes the surface protection film 1 to adhere to the electrically-conductive substrate when applied. The composition of the adhesive layer is not especially limited, so long as proper adhesion is achieved according to the invention, for example with the optional use of a slip solution and/or a tack solution. Further, the adhesive of the adhesive layer 10 should have the ability to stretch to some extent, given that the film will be stretched and pulled during installation. Without limitation, the adhesive layer 10 may be comprised of an adhesive that is suitable for bonding substrates to windows, such as conventional window films. Examples include pressure sensitive adhesives, such as an acrylic-based adhesive. Loctite Duro-Tak 109A (available from Henkel) is an example of such an adhesive.

A wide variety of compatible adhesives are thus useful according to the invention, for example acrylic-based polymers that may be cross-linked. Other examples include non-crosslinked PSAs where the base polymer is an A-B-A type block copolymer rubber, an A-B-A type random copolymer or a hydrogenation product (hydrogen addition product) thereof; and PSAs in which the base polymer is a butene polymer containing butene (inclusive of 1-butene, cis- or trans-2-butene and 2-methylpropene (isobutylene)) as the main monomer. Further examples of a non-crosslinked PSA are olefin polymers, such as propylene-a-olefin copolymers and propylene-ethylene-a-olefin copolymers.

According to the invention, and turning again to FIG. 1, the adhesive layer may also have a release liner 20 attached thereto. The release liner 20 advantageously provides a release effect against the sticky adhesive layer. The release liner 20 in the depicted embodiment can comprise, for example, a polyethylene terephthalate (PET) film with a silicone release coating that can be peeled from the adhesive layer leaving the adhesive layer on the stretchable film layer. Alternatively, the adhesive and release layers may comprise a suitable adhesive with a polypropylene liner.

The surface-protection films of the invention may optionally further comprise a stretchable protective layer 15, applied on a second surface 12 of the stretchable polymer film layer 5, which second surface is opposite the first surface. The nature and composition of this stretchable protective layer 15 is not especially limited, so long as the stretchable protective layer is sufficiently stretchable so as to bend rather than crack or separate when the surface-protection film is stretched. Suitable materials for use as a stretchable protective layer include polyurethanes, polyesters, polycaprolactones, polyvinyls such as PVB and PVC, polyethers, or UV-curable acrylates and/or methacrylates.

Surface-protection film products suitable for use according to the invention include SunTek, Llumar, and V-Kool brand Paint Protection Films, among others.

As noted, the surface-protection film is typically stretched when applied to the electrically-conductive substrate such that the thickness of the surface-protection film may vary across a surface of the substrate. Similarly, the surface-protection film may be applied to the electrically-conductive substrate such that the tension of the surface-protection film varies across a surface of the substrate. Typically, both the thickness and the tension of the surface-protection film varies across a surface of the substrate.

According to the invention, the surface protection films (SPFs) may be applied to the substrate using a slip solution, and proper adhesion may also benefit from the use of a tack solution. In contrast with conventional window film, SPFs exhibit a certain level of elasticity or stretchability, which facilitates the SPF being molded to 3-dimensional surfaces, that is, to surfaces having one or more irregularities. To keep the film in place, the compatible adhesive layer exhibits relatively high tack. When the installer is ready to mount a piece of SPF coated with slip solution, they may apply a tack solution to a specific and localized area of the vehicle body, typically by spraying, and position the PPF section coated with the slip solution precisely where it is intended to go. Alternatively, only a slip solution is used, with adhesion being encouraged by pressure being applied to the film at certain areas to cause the desired adhesion prior to stretching and applying of the SPF around the one or more irregularities.

With respect to paint protection film applied to automobiles, when the installer is ready to apply the paint protection film, they typically coat the whole area of film to be applied with the slip solution and then apply the tack solution in a localized area of the substrate where the installation will begin, usually on one side. The tack solution is intended to promote tack in that localized area. Only a minimal pressure of squeegeeing is performed to enable the installer to move the film piece if that becomes necessary, but the tack should be high enough to prevent the film piece from moving while the installer pulls and stretches the film across the automobile body in preparation for tacking down the piece to the other side of the car, in the same fashion. Again, tack solution is applied to promote tack in a localized area, and minimal squeegeeing is performed to again enable the installer to stretch the film further, this time also tacking it down in the middle of the car body to provide three areas of attachment for the installation. Once these areas are tacked down, the installer proceeds to squeegee out the remaining fluid to conform the film to the 3-dimensional body of the car. The process is repeated until the film is fully adhered to the substrate.

Thus, in one aspect, the surface-protection film may be applied to the electrically-conductive substrate by a method comprising: applying a slip solution comprising one or more surfactants to the surface protection film, or the electrically-conductive substrate, or both; contacting the substrate with a tack solution at a first location on the substrate; contacting the surface-protection film with the first location on the substrate to thereby adhere the film to the electrically-conductive substrate at the first location; contacting the substrate with a tack solution at a second location on the substrate; stretching the surface-protection film as needed to conform the surface protection film to the at least one irregularity of the electrically-conductive substrate; and contacting the surface-protection film with the second location on the substrate to thereby adhere the film to the electrically-conductive substrate at the second location. As noted, such methods may cause one or more of the thickness or the tension of the surface-protection film to vary across a surface of the substrate.

In another aspect, the surface-protection film may be applied to the electrically-conductive substrate without the use of a tack solution, by simply contacting the surface-protection film at a first location on the substrate to thereby adhere the film to the electrically-conductive substrate at the first location; stretching the surface-protection film as needed to conform the surface protection film to the at least one irregularity of the electrically-conductive substrate; and contacting the surface-protection film at a second location on the substrate to thereby adhere the film to the electrically-conductive substrate at the second location. In this aspect, no application solutions are required, or either of the solutions may be used independently of the other, but the stretching of the surface-protection film may nonetheless cause the thickness or the tension of the surface-protection film to vary across a surface of the substrate, or both the thickness and the tension.

When we say that the thickness of the SPF may vary across the surface of the SPF, or across the surface of the substrate to which it is applied, we mean that the thickness of some portions of the SPF may be substantially the same as, similar to, or slightly more than the thickness of the SPF in the unstretched state, while in other areas the thickness may be less, for example less than about 95% of the thickness of the unstretched SPF, or less than about 90% of the thickness of the unstretched SPF, or less than 80% of the thickness of the unstretched SPF, or even less than about 60% or less than 50% of the thickness of the unstretched SPF. The thickness of the SPF may thus vary across the surface of the SPF, or across the surface of the substrate to which it is applied, from about 50% to about 110%, or from about 60% to about 105%, or from 65% to 100%, of the thickness of the SPF in the unstretched or unstressed state, across the surface of the SPF, accounting for areas in which the SPF may bunch slightly, creating a thickness slightly greater than the thickness of the SPF in the relaxed state.

In those methods in which slip solutions are used according to the invention, they help prevent the adhesive of the film from sticking to itself, and/or facilitate the film "slipping" or sliding across the surface of the substrate to which it is applied, or is to be applied, prior to final adhesion. This is typically achieved by use of one or more surfactants, and especially those that are compatible with the adhesive of the film.

Slip solutions that are useful according to the invention are characterized by the presence of one or more surfactants in an aqueous solution. Suitable slip solutions thus include those that are analogous to traditional baby shampoo in water. For example, a suitable formulation used as a slip solution concentrate includes from about 85-95% water, from about 1 to about 10% ethoxylated sorbitan monolaurate, and from about 1 to about 5% sodium trideceth sulfate. The amount of surfactant(s) present in the slip solutions may thus vary widely, for example from about 0.01% to about 10% by volume, or from 0.05% to 5%, or from 0.1% to 2.5% by weight. In further aspects, the amount of one or more surfactants used in the solutions of the invention may be at least 0.01%, or at least 0.05%, or at least 0.1%, or at least 0.5%, up to about 15%, or up to 10%, or up to 5%, or up to 2.5%, or up to 2%, or up to 1%, or up to 0.5%, in each case by weight.

These slip solutions may include further additives, if advantageous, so long as the solutions remain compatible with the adhesive. Other suitable slip solutions are other formulations that contain sodium trideceth sulfate as a surfactant. When sodium trideceth sulfate is formulated in baby shampoos, it acts as a low-irritation cleansing agent, and when formulated in a slip solution for use according to the invention, is compatible with the adhesive of the film such that the adhesive retains substantial adhesive properties after being exposed to the slip solution. Surfactants other than sodium trideceth sulfate may alternatively be used in the slip solutions of the invention, especially non-ionic surfactants which are much milder than charged anionics. Thus, for example, nonionic surfactants of the form of polyethoxylated synthetic glycolipids and/or polyethoxylated synthetic monoglycerides may be advantageously used according to the invention. However, charged anionic surfactants may nonetheless be used so long as they are compatible with the adhesive used, such that the adhesive retains substantial adhesive properties after being exposed to the slip solution containing such anionic surfactants. Also, contrary to baby shampoos in which surfactants producing anesthetizing effects are best avoided, alkyl polyethoxylates or alkylphenol polyethoxylates may be used as surfactants in the slip solutions of the invention, again so long as they are compatible with the adhesive used, such that the adhesive retains substantial adhesive properties after being exposed to the solutions containing such surfactants.

A "tack solution," as further described herein, means a solution that increases the tack of an adhesive when applied to the adhesive, and especially to an adhesive that has a slip solution applied to it. Tack solutions useful according to the invention include those disclosed and claimed in U.S. Patent Application No. 62/756,755 filed Nov. 7, 2018, and especially those containing formic acid, the disclosure of which is incorporated herein by reference in its entirety. A wide range of amounts of formic acid may be used in the tack solutions of the invention, for example from about 0.05% to about 25%, or from 0.1% to 10%, or from 0.2% to 5%, in each case by volume. In further aspects, the amount of formic acid in the solutions of the invention may be at least 0.05%, or at least 0.1%, or at least 0.2%, or at least 0.5%, up to about 25%, or up to 20%, or up to 15%, or up to 12%, or up to 10%, in each case by volume. The tack solutions useful according to the invention are typically comprised substantially or predominantly of water, that is, they are aqueous solutions that have additional amounts of other materials.

Other suitable tack solutions useful according to the invention include aqueous compositions containing one or more alcohols containing 1-5 carbon atoms, for example methanol, ethanol, propanol, isopropanol (isopropyl alcohol or IPA), butanol, or pentanol present in the tack solution in an amount from about 1% to about 10% by volume. Further tack solutions useful according to the invention include those having other lower organic acids such as acetic acid, propionic acid, butyric acid, or the like, having from 2-5 carbon atoms. However, these acids have noticeable odor and contribute to the VOC content and thus may be best reduced or avoided. Thus, in some aspects, the solutions of the invention contain no more than 5%, or no more than 2%, or no more than 1%, or no more than 0.5%, or no more than 0.1%, by volume, of organic acids having from 2-5 carbon atoms.

In another aspect, the invention relates to devices for carrying out the method of claim 1, the devices typically being an open circuit comprising: an electrically-conductive substrate mounted at a vertical and/or a horizontal angle provided with at least one irregularity; a power supply, in electrical communication with the electrically-conductive substrate; one or more notification devices selected from a visual alert, an audible alert, or a tactile alert, in electrical communication with the power supply and the electrically-conductive substrate; and an electrically-conductive knife, in electrical communication with the one or more notification devices, the power supply, and the electrically-conductive substrate such that, when the knife is brought into contact with the electrically-conductive substrate, the open circuit is closed, causing the one or more notification devices to activate.

Power supplies useful according to the invention include, without limitation, any suitable alternating or direct current that, when the circuit described herein is closed, cause the one or more notifications to activate. This may be a battery providing direct current, a power supply that converts an alternating current to a direct current that simulates a battery, or an alternating current for example directly from a wall outlet. Naturally, the electricity from the power supply will need to be properly insulated, both from the installer as well as from the associated parts of the devices of the invention which are not intended to be in electrical communication with one another.

The one or more notification devices suitable for use according to the invention may be selected, without limitation, from one or more of a visual alert, an audible alert, or a tactile alert. These devices will be in electrical communication with the power supply and the electrically-conductive substrate. However, the electrical communication of the one or more notification devices with the other elements of the devices of the invention need not be a direct electrical communication, but rather, the communication may be indirect, wherein the contact of the knife with the substrate causes an indirect activation of the notification device, which may, for example be provided with its own independent power supply separate from other portions of the devices of the invention. Any suitable commercially available light, audio device, or tactile device may be used according to the invention, without limitation.

Figure 2:
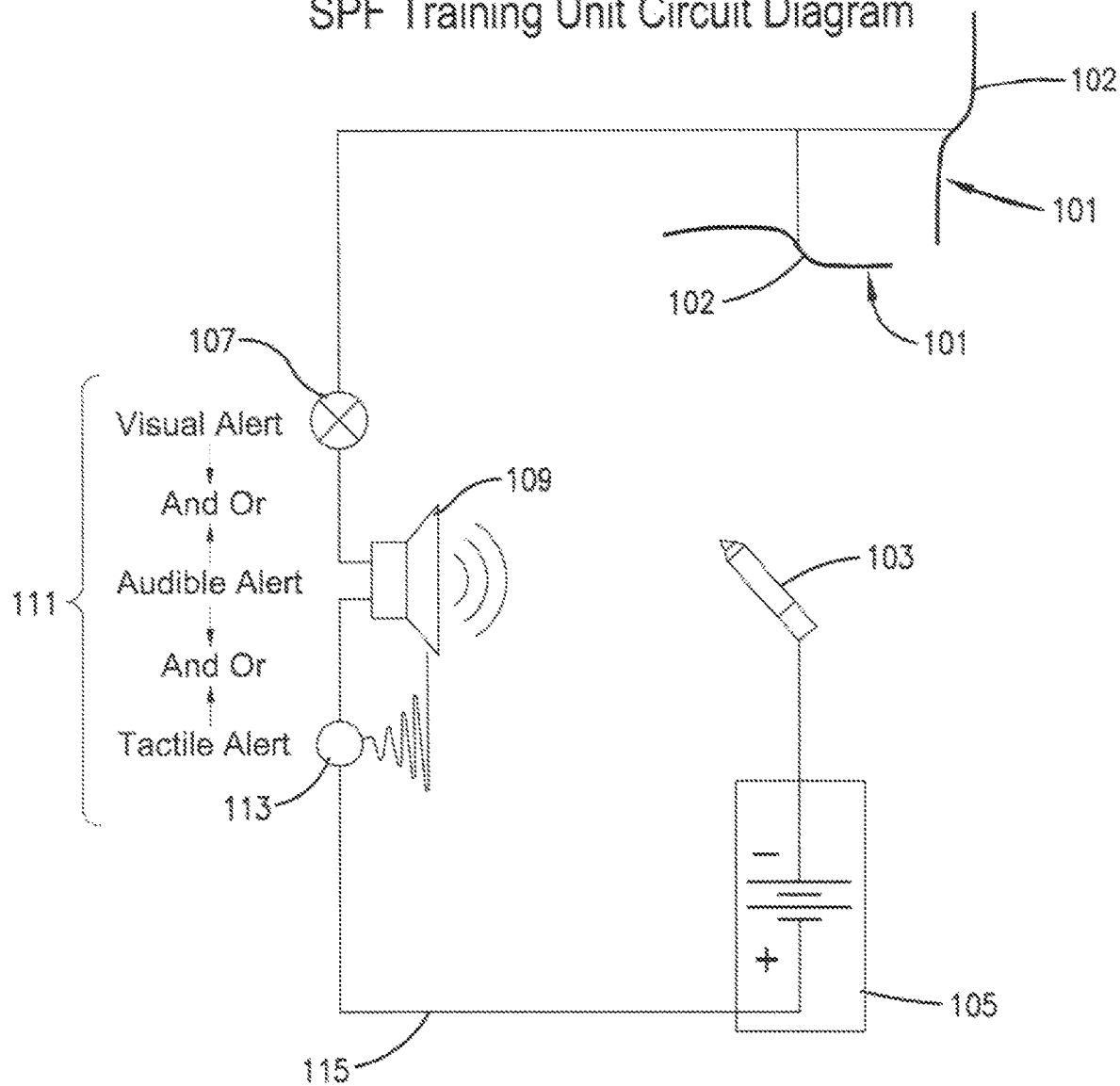
FIG. 2 depicts a training unit circuit diagram schematic of a tool that is suitable for use according to the present invention.

In a further aspect, the invention thus relates to training devices that are useful according to the invention to develop an installer's level of skill and "feel" in cutting through an SPF material during installation without damage to the underlying vehicle substrate. In brief, turning now to FIG. 2 which is a schematic-type diagram, the device 111 schematically includes an electrically-conductive substrate 101 mounted at a vertical and/or a horizontal angle, or both as depicted here, provided with at least one irregularity, such as the curves or bends 102 depicted in FIG. 2. Also provided is an electrically-conductive knife 103 placed in an open circuit 115 with a power supply 105, and one or more notifications such as a visual alert 107, an audible alert 109, and/or a tactile alert 113. This circuit is also in electrical communication with the electrically-conductive substrate such that, when the electrically-conductive knife 103 inadvertently but inevitably comes into contact with the electrically conductive substrate 101 during training, one or more of the afore-mentioned notifications is activated. Thus, in use according to the invention, the stretchable surface-protection film is applied to the electrically-conductive substrate 101 provided with at least one irregularity; and an installer trainee uses the electrically-conductive knife 103 to initiate cutting the PPF sample along the cutting surface, that is, along the electrically-conductive substrate.

Should the trainee cut through the thickness of the SPF such that the knife contacts the electrically-conductive substrate, an electrical circuit is closed by the electrical grounding of the blade against the surface and the alarm or other notification is energized or otherwise activated.

In this aspect, the invention thus relates to a training unit 111 for carrying out the methods of the present invention, which is a tool to help teach how to cut or trim SPF on a substrate without marring the substrate with the blade of the knife. It is an open circuit design such that when the blade of the knife touches the training substrate below the SPF it acts like a switch completing the circuit and allowing current to flow from the batteries or other power supply to a visual, audible, and/or tactile notification devices. This feedback instantly indicates to the trainee that he or she has contacted the substrate below the film and that the student was applying too much pressure and/or using an improper blade angle. This immediate feedback enables the trainee to feel the different layers of construction and to learn how the knife behaves or feels as it slides through them and approaches the adhesive layer which bonds the film to the substrate. The electrically-conductive substrate is connected to the circuit and is intended to elicit the various changes in angle, cutting positions, and shapes of the knife needed to properly cut the SPF around the irregularities of the substrates that can be encountered during application and cutting of the SPF.

Figure 3:
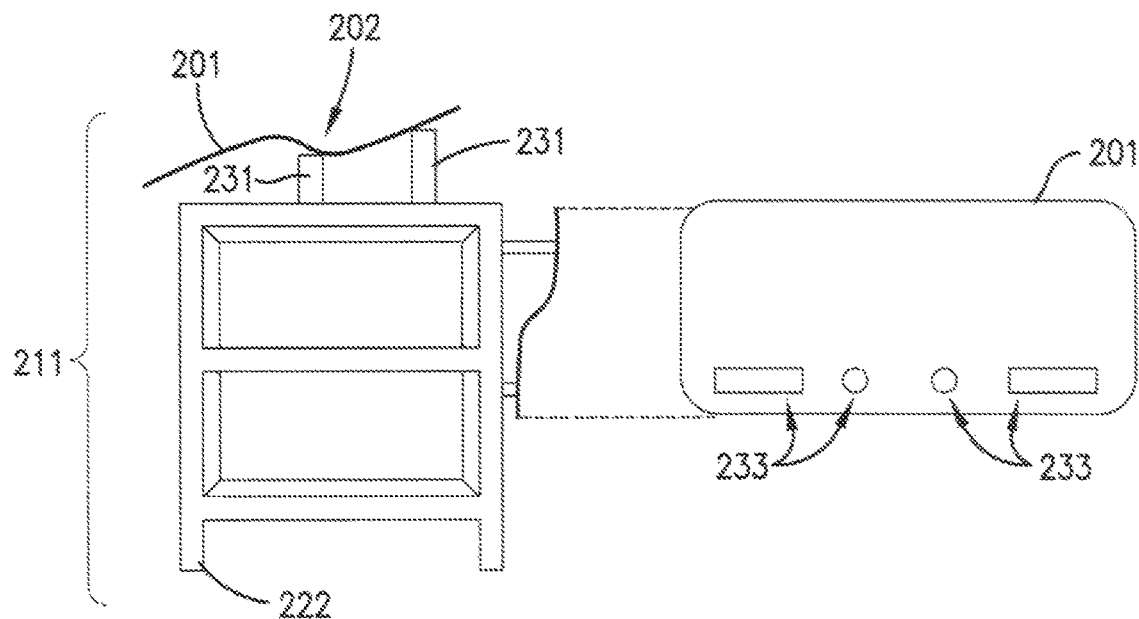
FIG. 3 depicts a stand-mounted training unit that is useful according to the invention.

As can be seen in FIG. 3, the training device may be a stand-mounted training unit 211 comprising a stand or table 222, the electrically-conductive substrate 201 being provided with at least one irregularity 202, and mounted on one or more supports 231. FIG. 3 further depicts the electrically-conductive substrate 201 in plan view, diagrammatically indicating the presence of shapes 233 which may variously represent irregularities such as voids, holes, or projections. Further elements of the training device of FIG. 3 not pictured correspond to those of FIG. 2.

Figure 4:
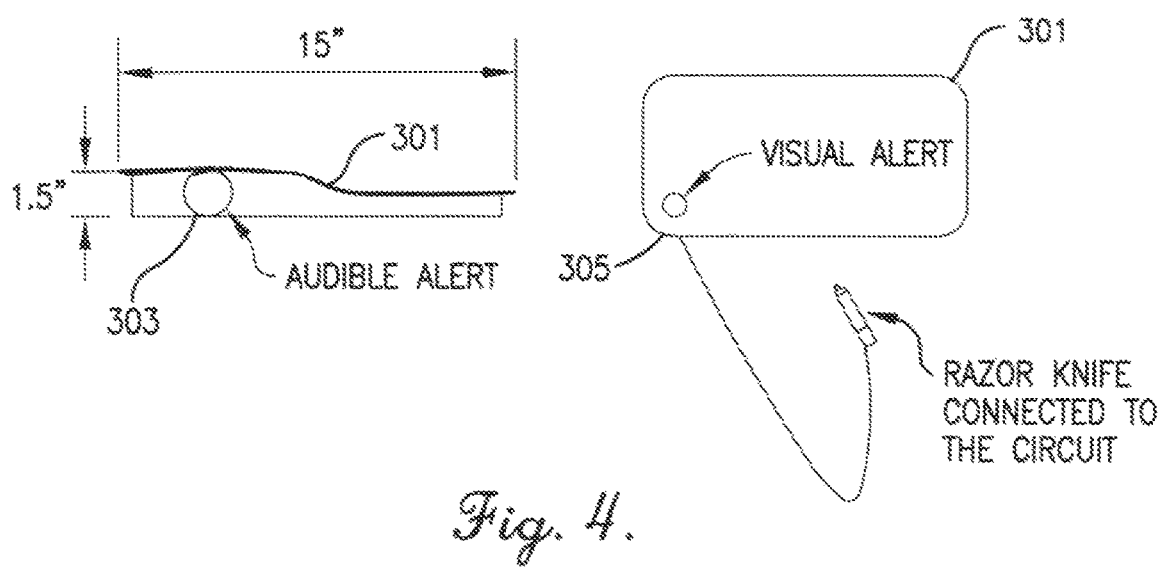
FIG. 4 depicts a portable training unit that is useful according to the invention.

Similarly, the training device may comprise a portable training device such as that depicted in FIG. 4 in which the electrically-conductive substrate 301 is depicted in both a side view and a plan view, with a speaker audio notification device 303 positioned beneath the substrate 301 and a visual alert 305 depicted at a corner of the substrate 301. Further elements of the training device of FIG. 4 not pictured correspond to those of FIG. 2. The units depicted in FIGS. 3 and 4 function essentially the same, but the portable training device of FIG. 4 is designed to fit in a backpack to be easily transported and used in locations outside of a typical training setting. The portable unit may be used even by experienced installers prior to beginning to cut on the actual substrate to be protected, in order to recalibrate their cutting pressure through the immediate feedback from the unit, saving expensive repairs that may result if the actual substrate is damaged.

In the preceding aspects, the invention provides an installation training tool that can detect multiple improper cutting techniques of SPF when installed on an electrically-conductive substrate as already described. The circuitry described provides real time feedback to train both existing and new SPF installers how to cut or trim SPF in both a vertical and a horizontal position on a three-dimensional or two-dimensional conductive substrate provided with at least one irregularity, without contacting the substrate below the film. The three-dimensional substrates are designed to mimic the challenges that will be faced in the surface protection fields and can provide visual feedback, audible feedback, or tactile feedback or a combination of the three. The trainer comes in two different models, one is a stand mounted version and the other is a portable unit approximately the size of a standard clipboard.

While the methods and training units of the present invention have been described above in detail with respect to various embodiments, it will be understood by the person of ordinary skill that the present invention may be utilized in a wide variety of analogous end-use applications.

The following examples set forth suitable and/or preferred methods and results in accordance with the invention. It is to be understood, however, that these examples are provided by way of illustration and nothing therein should be taken as a limitation upon the overall scope of the invention. All percentages are by weight unless otherwise specified.

EXAMPLE

In this prophetic example, an installer applies a slip solution to at least a portion of the adhesive layer of an SPF, and the SPF is thereafter contacted with the electrically-conductive substrate of a training device which is also provided according to the invention with an electrically-conductive knife. The knife and the substrate are in electrical communication with one another, as well as with a power supply and one more notifications in an electrical circuit that is open during application of the SPF. Once the SPF is contacted with the substrate, the SPF is positioned more accurately on the substrate by sliding the film as needed along the surface of the substrate. Once the SPF is in the desired initial position, a corner of the SPF is raised and tack solution is applied at a first location on the substrate, and the SPF is reapplied to the substrate at the location where the tack solution was applied, causing the SPF to adhere to the substrate. The SPF is thereafter stretched over or around one or more irregularities, and the SPF is adhered again at a second position on the substrate using tack solution as before. After optionally applying tack solution at a third location on the substrate to firmly adhere the SPF to the substrate at the third location, the film is squeegeed to remove excess application solutions and more firmly adhere the SPF to the substrate.

Once the preceding steps of applying the SPF to the substrate have been accomplished, the installer cuts the SPF as applied to the substrate to remove excess film material from the substrate in or around the one or more irregularities. At least once during the cutting of the SPF, the film installer will cut the SPF incorrectly, thereby causing the knife to contact the substrate, closing the circuit and thereby activating the one or more notifications. The methods and devices according to the invention thus help the installer to minimize the risk to actual substrates through repetitive exposure and practice at cutting SPFs installed on device substrates without the potential to damage an expensive car but with immediate feedback being given to help train the installer for the feel of the blade when cutting at the proper depth.

We note that when installing SPF on automobiles it is often required to hand cut the film around back up sensors, reflectors or badges after installation on the automobile. Higher skilled installers often bulk apply the film then trim the film to the edge of each car panel for a quality fit. During either of these circumstances the risk of damaging the paint is present and these training devices according to the invention help to minimize the risk through repetitive exposure without the potential to damage an expensive car but with immediate feedback being given to help train the installer for the feel of the blade when cutting at the proper depth.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A method to train an installer to cut a film without damaging an underlying substrate, the method comprising:
  applying a stretchable surface-protection film to an electrically-conductive substrate provided with at least one irregularity; and cutting the surface protection film with an electrically-conductive knife which, when in contact with the electrically-conductive substrate, causes one or more notifications to occur,
wherein the surface protection film comprises:
a stretchable polymer film layer;
an adhesive layer, on a first surface of the stretchable polymer film layer, which causes the surface protection film to adhere to the electrically-conductive layer when applied; and
a stretchable protective layer, applied on a second surface of the stretchable polymer film layer, which second surface is opposite the first surface.

2. The method of claim 1, wherein the surface-protection film is applied to the electrically-conductive substrate such that the thickness of the surface-protection film varies across a surface of the substrate.

3. A method to train an installer to cut a film without damaging an underlying substrate, the method comprising:
applying a stretchable surface-protection film to an electrically-conductive substrate provided with at least one irregularity; and
cutting the surface protection film with an electrically-conductive knife which, when in contact with the electrically-conductive substrate, causes one or more notifications to occur, wherein the surface-protection film is applied to the electrically-conductive substrate such that the tension of the surface-protection film varies across a surface of the substrate.

4. The method of claim 1, wherein the surface-protection film is applied to the electrically-conductive substrate by a method comprising:
applying a slip solution comprising one or more surfactants to the surface protection film, or the electrically-conductive substrate, or both;
contacting the substrate with a tack solution at a first location on the substrate;
contacting the surface-protection film with the first location on the substrate to thereby adhere the film to the electrically-conductive substrate at the first location;
contacting the substrate with a tack solution at a second location on the substrate;
stretching the surface-protection film as needed to conform the surface protection film to the at least one irregularity of the electrically-conductive substrate; and
contacting the surface-protection film with the second location on the substrate to thereby adhere the film to the electrically-conductive substrate at the second location.

5. The method of claim 4, wherein the stretching of the surface-protection film causes the thickness of the surface-protection film to vary across a surface of the substrate.

6. The method of claim 4, wherein the stretching of the surface-protection film causes the tension of the surface-protection film to vary across a surface of the substrate.

7. A method to train an installer to cut a film without damaging an underlying substrate, the method comprising:
applying a stretchable surface-protection film to an electrically-conductive substrate provided with at least one irregularity; and
cutting the surface protection film with an electrically-conductive knife which, when in contact with the electrically-conductive substrate, causes one or more notifications to occur, wherein the surface-protection film is applied to the electrically-conductive substrate by a method comprising:
contacting the surface-protection film at a first location on the substrate to thereby adhere the film to the electrically-conductive substrate at the first location;
stretching the surface-protection film as needed to conform the surface-protection film to the at least one irregularity of the electrically-conductive substrate; and
contacting the surface-protection film at a second location on the substrate to thereby adhere the film to the electrically-conductive substrate at the second location.

8. The method of claim 7, wherein the stretching of the surface-protection film causes the thickness of the surface-protection film to vary across a surface of the substrate.

9. The method of claim 7, wherein the stretching of the surface-protection film causes the tension of the surface-protection film to vary across a surface of the substrate.

10. The method of claim 1, wherein the stretchable polymer film layer comprises one or more of: a polyurethane, a polyester, a vinyl, PVB, PVC, a polyether, or a polycaprolactone.

11. The method of claim 1, wherein the at least one irregularity comprises one or more of a bend, a curve, an edge, a ridge, a valley, a void, or a hole.

12. The method of claim 1, wherein the one or more notifications comprise one or more of a light, a sound, a vibration, or a mild electrical shock.

13. The of claim 1, wherein the electrically-conductive knife is provided with a cutting blade, the depth of which is not fixed.

14. The method of claim 1, wherein a depth, a pressure, and/or an angle of the cutting of the surface-protection film with the electrically-conductive knife varies across a surface of the surface-protection film.

15. The method of claim 5, wherein the thickness of the surface-protection film is less than 80% of the thickness of the unstretched SPF in at least one point on the surface of the substrate.

16. The method of claim 1, wherein a stretchability of the surface-protection film is from about 150% to about 500%.

17. A device for carrying out the method of claim 1, the device being an open circuit comprising:
an electrically-conductive substrate mounted at a vertical and/or a horizontal angle provided with at least one irregularity;
a power supply, in electrical communication with the electrically-conductive substrate;
one or more notification devices selected from a visual alert, an audible alert, or a tactile alert, in electrical communication with the power supply and the electrically-conductive substrate; and
an electrically-conductive knife, in electrical communication with the one or more notification devices, the power supply, and the electrically-conductive substrate such that, when the knife is brought into contact with the electrically-conductive substrate, the open circuit is closed, causing the one or more notification devices to activate.

* * * * *